May 7, 1940. E. F. GAMBLE ET AL 2,199,661
DEVICE FOR AUTOMATICALLY MAINTAINING THE CARBONATING
AGENT IN CARBONATED BEVERAGES
Filed March 11, 1939 2 Sheets-Sheet 1

INVENTORS
Edward F. Gamble
Frank N. Towle

May 7, 1940. E. F. GAMBLE ET AL 2,199,661
DEVICE FOR AUTOMATICALLY MAINTAINING THE CARBONATING
AGENT IN CARBONATED BEVERAGES
Filed March 11, 1939 2 Sheets-Sheet 2

INVENTORS
Edward F. Gamble
Frank N. Towle

Patented May 7, 1940

2,199,661

UNITED STATES PATENT OFFICE 2,199,661

DEVICE FOR AUTOMATICALLY MAINTAINING THE CARBONATING AGENT IN CARBONATED BEVERAGES

Edward F. Gamble, Palo Alto, and Frank N. Towle, Los Altos, Calif.

Application March 11, 1939, Serial No. 261,398

5 Claims. (Cl. 225—17)

This invention relates to a new method and an especially constructed device for automatically regulating the gas pressure from an external source to carbonated beverages in containers, such as beer in kegs, to automatically maintain under all and varying temperature conditions the ideal pressure necessary to hold the carbonated agent in suspension in the beverage.

The present methods in use for regulating the gas pressure on carbonated beverages do not accomplish the ideal result due to the fact that they do not include a means for taking care of the losses caused by the fluctuation in temperature of the beverage and gas in the container. When the temperature in the container increases it causes the gas therein to expand and increases the gas pressure in the container above the normal pressure that the regulator was set to maintain, resulting in losses of the carbonating agent from the beverage when the beverage is drawn, thus decreasing the percentage of the carbonating agent in solution from the ideal percentage originally provided in the beverage.

The present invention is especially provided to improve the handling of draught beer which is kept in kegs or other suitable closed containers. All beer contains carbon dioxide, $CO_2$ gas, which is the result of the fermentation of the materials in making the beer. The control of the $CO_2$ gas in the beer, after the keg has been tapped is very important, so that the beer may have the same percentage of $CO_2$ gas in solution as when it left the brewery. The amount of $CO_2$ gas that will be held in solution in the beer, after the keg has been tapped, will depend on the temperature of the beer and the gas pressure applied against the beer in the keg. The higher the temperature of the beer, the greater will be the amount of loss of the $CO_2$ gas from the beer. The lower the temperature of the beer the greater will be the amount of $CO_2$ gas retained in the beer. Also, the greater the pressure applied in the keg from the external source, the greater will be the amount of $CO_2$ gas absorbed and maintained in the beer.

From the foregoing it will readily be seen that there is a relationship between temperature and pressure in maintaining the proper percentage of $CO_2$ gas in the beer after the keg has been tapped in order that the beer may have the same quality as when it left the brewery. For example if the brewery makes a beer to contain a certain percentage of $CO_2$ gas at a temperature of 55 degrees Fahrenheit at a pressure of 25 pounds per square inch in the keg, that is the particular percentage of $CO_2$ gas that should be maintained in the beer while the beer is being used regardless of the temperature. It follows that if the tendency of the $CO_2$ gas is to escape the solution when the temperature of the beer in the keg increases, a greater pressure from the external source should be exerted against the beer to hold the gas suspended in the solution to prevent the beer from becoming too flat. Likewise, when the temperature of the beer in the keg decreases while the beer is being used, the pressure exerted against the beer in the keg from the external source should be decreased to prevent a too great an amount of $CO_2$ gas from being driven in solution and retained in the beer, causing the beer to get too sharp.

It is therefore a primary and fundamental object of the present invention to provide a device which will automatically increase the pressure exerted against the beer in the keg from the external source when the temperature of the beer in the keg increases and which will also automatically decrease the pressure exerted against the beer in the keg from the external source when the temperature of the beer decreases, while the beer is being used.

It is another fundamental object of the present invention to provide a device for essentially maintaining the original volume ratio of the carbonating agent with respect to the beverage in various types of carbonated beverages under varying temperature conditions while the beverage is being used.

It is another object of the invention to provide a pressure regulating valve to control the gas pressure in the beverage container and means that is adapted to automatically open the valve with respect to the container when the temperature of the gas and beverage in the container increases beyond a predetermined degree.

It is the specific object of the invention to provide a device of the character described with an especially constructed pressure regulating valve and an especially constructed thermal element, and to form the thermal element with a gas chamber that is adapted to have communication with the valve and a liquid beverage chamber that is adapted to have communication with the beverage in the container, and to charge the gas chamber with the same carbonating agent at the same pressure and temperature as originally provided in the beverage and to construct and arrange the bodies of said chambers in such a relation to each other that will cause the temperature of the gas chamber to fluctuate and keep equal with the temperature of the beverage to cause the gas in the gas chamber to rise and expand and open the pressure regulating valve with respect to the container, when the temperature of the beverage and gas in the container rises beyond a predetermined degree, to enable an additional amount of external gas pressure to be supplied into the beverage container to maintain the original volume percentage of the carbonated agent in the beverage during different temperatures while the beverage is being used.

It is another object of the invention to also use the said gas chamber, mentioned in the foregoing paragraph, to automatically open the pressure regulating valve with respect to the beverage container whenever the pressure in the container is reduced below the normal set pressure, caused by drawing beverage from the container, to enable additional pressure to be supplied into the container to maintain a constant even pressure therein.

It is another object of the invention to provide a check valve in the gas line between the pressure regulating valve and the container so that in event of failure of gas pressure from the external source the pressure in the container cannot back up through the regulating valve to the supply drum.

It is another object of the invention to provide a plurality of manually operated bypass valves on the high pressure side of the regulating valve, one to the thermal control element so it can be charged originally, and recharged in case of leakage, and one to bypass the regulating valve completely so that in case of failure of the regulating valve, gas pressure from the supply drum could be conveyed to the beverage container through the manually operated valve.

The invention further consists in the particular combination, construction and association of the different parts, such as described in the following specification, and possesses various other objects and features of advantage, some of which, with the foregoing, will be made manifest in the preferred form of the invention that is illustrated in the drawings accompanying and forming part of the specification.

It is to be understood that it is not intended to limit the invention to the embodiment shown by said drawings and description, as variations may be adapted within the fundamental principle of the invention as set forth in the claims.

Figure 1:
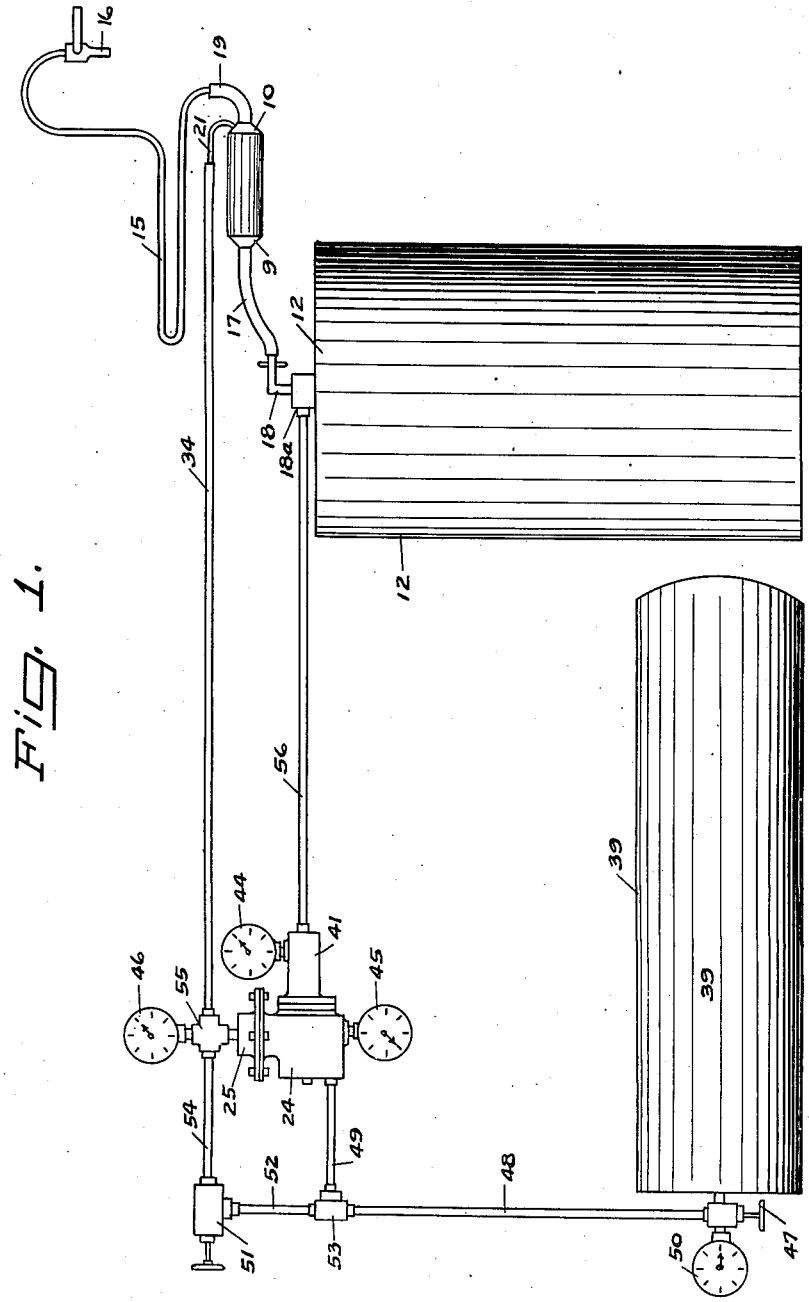
Figure 1 is an elevational layout view of the entire device and shows the general combination and the preferred relative arrangement of the various elements involved in the invention.
Figure 2:
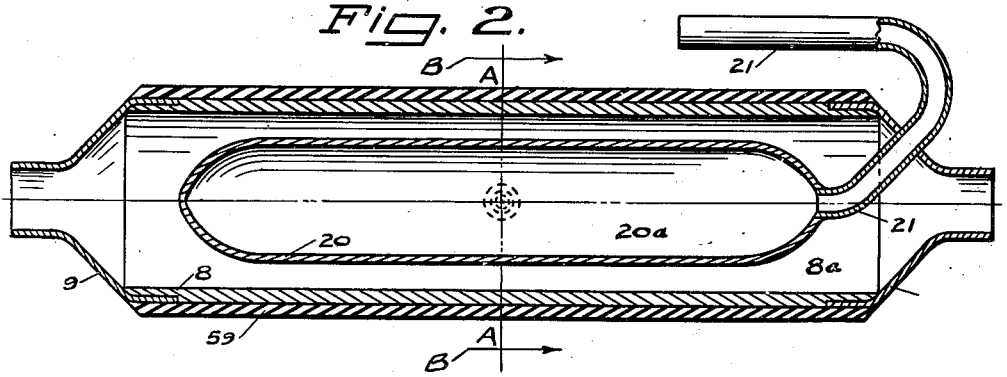
Figure 2 is a longitudinal sectional view of a preferred type and form of thermal element used in the invention and shows a gas chamber mounted within a beverage chamber in a manner that will cause both chambers to maintain equal temperatures.

Referring in detail to the drawings and the different parts thereof, wherein like reference numerals designate like parts throughout the various views, the numeral 8 designates a piece of tubing, of any suitable material and size and numerals 9 and 10 designate funnel shaped members that are substantially fixed on the outer ends of the tube 8 as shown in Figure 2, thus forming a thermal tube or chamber 8a for the beverage to pass through from the keg or beverage container 12 to the cooling coil 15 and faucet 16. Numeral 17 designates a rubber hose that leads from the outlet tap rod 18 of the container 12 to the chamber inlet 9 and the numeral 19 designates another rubber hose that leads from the chamber outlet 10 to the coil 15 as shown in Figure 1.

Figure 4:
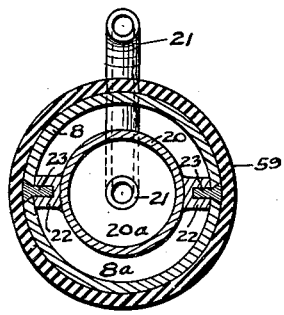
Figure 4 is a transverse sectional view taken on line A—A of Figure 2, looking in direction of arrows B.

As hereinbefore stated one of the objects of the invention is to provide a gas chamber and to form and arrange it in such relation to the beverage chamber that will cause it to maintain an even temperature with the beverage chamber A piece of tubing 20, of a smaller diameter and length than the tube 8, is therefore provided and is peaned at one end and provided with an outlet tube 21 at the opposite end and is mounted into the tube 8 as shown in Figure 2. The tube 20 is preferably held in position by having suitable lugs 22 soldered thereon and which are substantially held to the tube 8 by the pins or screws 23 as shown in Figure 4. A chamber 20a is thus formed within the chamber 8a and surrounded by the space within said chamber.

Figure 3:
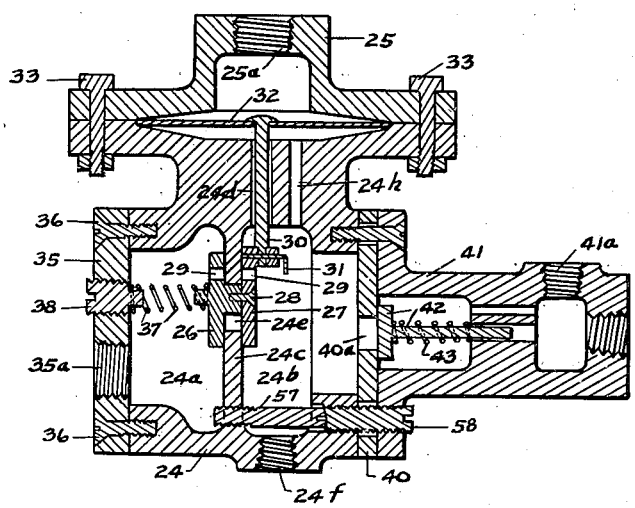
Figure 3 is a vertical sectional view of a preferred type of pressure regulating valve used in the invention.
Figure 5:
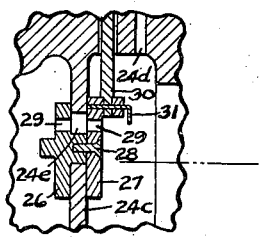
Figure 5 is a fragmentary sectional view of the inner central portion of the pressure regulator valve, showing the valve in its open position.

Any suitable type of pressure regulating valve may be used that will serve the purpose of the invention. A preferred type of valve is illustrated in Figure 3 and the construction shows a valve housing 24 that is formed with a high pressure chamber 24a and a low pressure chamber 24b. The partition 24c is accurately machined on both sides and is provided with an opening 24e to accommodate an especially constructed slide valve that is made into two halves 26 and 27 that are substantially held together by the screw 28 as shown in Figure 3. An orifice 29 is provided through the halves of the slide valve and is adapted to align with the partition opening 24c as shown in Figure 5 when the valve is moved into its lower position and to close off when it is in its upper and normal position. A valve rod 30 is provided and is mounted slidable into and through the hole 24d in the upper body portion of the housing 24 and is substantially fastened to the slide valve half 27 by the pin 31. A diaphragm 32 is fixed on the upper end portion of the valve rod 30 and is arranged between the housing 24 and housing cap 25 as shown in Figure 3. It is to be understood that a suitable bellows or any other resilient or flexible element that will serve the purpose of the invention can be used instead of the diaphragm if desired.

The housing cap is substantially held on the housing by means of bolts 33, and a pipe tap 25a is provided to accommodate a tube 34 that leads from the thermal element gas chamber outlet tube 21 so that gas pressure from the chamber can be applied directly against the top of the diaphragm. A plate 35 is provided over the high pressure chamber 24a and fastened to the housing by suitable screws 36. A light compression spring 37 is mounted against the high pressure side 26 of the slide valve and is held in position by the adjusting screw 38. This spring is provided to produce a slight tension against the valve to insure its seal and will toggle with the sliding movement of the valve. A tapped hole 35a is provided into and through the plate 35 so that suitable connection can be made with the gas supply drum 39 to enable gas to flow therefrom into the chamber 24a.

A check valve is provided and arranged between the beverage container 12 and the low pressure regulating valve chamber 24b to prevent the gas pressure from within the beverage container from backing up, in case of gas pressure failure from the source of supply, which would cause the beverage to lose its carbonization and go flat. The check valve consists in a detachable plate 40, having a hole therein 40a, a valve housing 41, valve rod and head 42, and compression spring 43, formed and arranged and held in position as illustrated in Figure 3. A tapped hole 41a is provided through the check valve housing wall to accommodate a pressure gauge 44 for checking the gas pressure between the check valve and the beverage container. Likewise a tapped hole 24f is provided in the bottom wall of the pressure regulating valve housing wall to accommodate a pressure gauge 45 for checking the gas pressure between the check valve and the diaphragm, the hole 24h leading to the space underneath the diaphragm. The pressure gauges 44, 45 and 46, shown in Figure 1, should all register essentially the same pressures when the pressure regulating valve and check valve are in their normal and closed position.

In Figure 1 there is illustrated the general layout of the device. The gas drum is provided with a valve 47 and has communication with the pressure regulator gas chamber 24a through tubes 48 and 49, the tube 49 leading into the tapped hole 35a provided in the chamber plate 35. The numeral 50 designates the master gauge. The numeral 51 designates a bypass valve that is provided to enable the thermal gas chamber 20a and the line leading thereto to be charged from the drum 39 and recharged in case of leakage. Numeral 52 designates a tube that leads from the inlet side of the bypass valve 51 to the T 53 and the numeral 54 designates a tube that leads from the outlet of said bypass valve to the cross fitting 55 that is connected to the tube 34 and which has communication with the thermal gas chamber 24a. The numeral 56 designates the tube that leads from the check valve to thhe pipe fitting 18a which is a standard connection that is provided on the tap rod 18 for the purpose of enabling the external gas pressure source to have communication with the inside of the beverage container and is standard apparatus that comes with certain types of tap rods. The numeral 57 designates a set screw that is provided in the partition 24c of the valve housing to close a tapped hole in said partition that is provided to allow for manual control of the external gas pressure that is supplied to the beverage container in the event of failure in the automatic operation of the regulating valve. The removing of this set screw would provided direct communication between the gas pressure supply drum 39 and the beverage container and the pressure could be manually controlled by the master valve 47. The set screw 58 is provided to cover a tapped hole in the valve housing 24 to provide access to the set screw 57. The numeral 59 designates a rubber or other suitable covering that is provided over and around the tube 8. It is to be understood that the thermal element can be located in any suitable location, above or below the beverage container or even within the beverage container.

When it is desired to put the device into operation the bypass valve 51 is opened and the thermal element gas chamber 24a and the line leading thereto is charged from the gas supply drum to a pressure equal to the pressure in the beverage container 12, when the temperatures are equal. The pressure gauges 44, 45 and 46 should all register essentially the same pressure. The valve 51 is then closed and the pressure from the chamber 24a will be exerted against the top of the diaphragm 32 through the tube 34. When the beverage is drawn it will flow through the tube 8 and will surround the tube 24 and will cause the gas in the chamber 24a to automatically maintain the same temperature as the beverage. When the temperature of the beverage drawn from the container increases, the temperature and pressure of the gas in the chamber 24a will increase and produce a greater pressure on top of the diaphragm 32, thus opening the pressure regulating valve and causing a greater pressure from the external source to be exerted against the beverage in the container to hold the carbonated agent suspended in the beverage to prevent the beverage from getting too flat. Likewise, when the temperature of the beverage drawn from the container decreases, the temperature and pressure of the gas in the chamber 24a will decrease, causing a less pressure to be exerted against the diaphragm and a less pressure from the external source to be exerted against the beverage in the container to prevent the beverage from getting too sharp.

Having thus illustrated and described a certain form of construction and arrangement of parts pertaining to the invention, it is to be understood that the invention can be built in any suitable manner, the present illustration not being utilized as indicating the only arrangement of parts and form of construction into which the device can be made, and it is desired to include in this application for Letters Patent of the United States of America, any and all patentable novelty that exists in the description disclosed and all that comes within the fundamental principle of the invention as set forth in the claims hereinafter mentioned.

What is claimed:

1. A device of the character described, for use in combination with a container for holding draught carbonated beverages and an element for forcing external gaseous pressure into the container, provided with means for automatically increasing the external gaseous pressure forced into the container when the beverage in the container increases in temperature and beverage is drawn from the container.

2. A device of the character described for use in combination with a container for holding draught carbonated beverages and an element for forcing gaseous pressure into the container, having means for automatically varying the gaseous pressure forced into the container on the beverage, by the temperature of the beverage.

3. A device of the character described, for use in combination with a container for holding draught carbonated beverages and an element for forcing external gaseous pressure into the container, comprising, a pressure regulating valve for controlling the amount of external gaseous pressure supplied into the container, and a thermal element containinng gaseous pressure and adapted to automatically open the pressure regulating valve when the gaseous pressure in the container is less than the gaseous pressure in said thermal element.

4. A device of the character described, for use in combination with a container for holding draught carbonated beverages and an element for forcing external gaseous pressure into the container, comprising, a pressure regulating valve for controlling the amount of external gaseous pressure supplied into the container, an element for containing gaseous pressure, means for enabling the second mentioned element to contact beverage from within the container to vary the temperature of gaseous pressure in the element with the temperature of the beverage in the container, and means for enabling gaseous pressure in the second mentioned element to automatically control the opening and closing of the pressure regulating valve for the purpose of automatically controlling the amount of external gaseous pressure forced into the container under different temperatures.

5. A device of the character described, for use in combination with a container for holding draught carbonated beverages and an element for forcing external gaseous pressure into the container, comprising, a pressure regulating valve for controlling the amount of external gaseous pressure supplied into the container, an element for containing gaseous pressure, fluid communication means between said element and regulating valve for the purpose of automatically controlling the opening and closing of the pressure regulating valve by the gaseous pressure in said element, said element being mounted in the beverage container outlet line to cause the temperature of the gas in said element to fluctuate and keep equal with the beverage that passes through said line.

EDWARD F. GAMBLE.
FRANK N. TOWLE.